United States Patent
Brunner et al.

(10) Patent No.: US 7,367,387 B2
(45) Date of Patent: May 6, 2008

(54) TUBE PLATE FOR EXHAUST HEAT EXCHANGER

(75) Inventors: Steffen Brunner, Weissach im Tal (DE); Thomas Bachner, Winterbach (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 10/279,657

(22) Filed: Oct. 24, 2002

(65) Prior Publication Data

US 2003/0079869 A1 May 1, 2003

(30) Foreign Application Priority Data

Oct. 26, 2001 (DE) .............................. 101 56 611

(51) Int. Cl.
*F28F 9/02* (2006.01)
(52) U.S. Cl. .................. 165/173; 165/175; 165/178; 29/890.043
(58) Field of Classification Search .................. 165/41, 165/51, 148, 152, 153, 173, 175, 178; 29/890.043
See application file for complete search history.

(56) References Cited

U.S. PATENT DOCUMENTS

| | | | | |
|---|---|---|---|---|
| 877,609 A | * | 1/1908 | Steiner ........................ | 165/148 |
| 989,185 A | * | 4/1911 | Onions et al. ............... | 165/153 |
| 2,303,416 A | * | 12/1942 | Woods ................... | 29/890.043 |
| 2,816,739 A | * | 12/1957 | Stochr ........................ | 165/178 |
| 3,540,529 A | | 11/1970 | Umino et al. | |
| 3,583,478 A | * | 6/1971 | Fieni ........................... | 165/178 |
| 4,072,039 A | | 2/1978 | Nakanishi | |
| 4,231,422 A | * | 11/1980 | Moranne ...................... | 165/178 |
| 4,577,380 A | * | 3/1986 | Warner ........................ | 165/153 |
| 4,722,387 A | * | 2/1988 | Aurand ........................ | 165/153 |
| 4,815,535 A | * | 3/1989 | Hagemeister ................ | 165/173 |
| 5,228,512 A | * | 7/1993 | Bretl et al. ............. | 29/890.043 |
| 5,327,959 A | * | 7/1994 | Saperstein et al. .......... | 165/173 |
| 6,269,870 B1 | | 8/2001 | Banzhaf et al. | |
| 6,293,337 B1 | | 9/2001 | Strahle | |
| 6,321,835 B1 | * | 11/2001 | Damsohn et al. ........... | 165/170 |
| 2004/0182547 A1 | * | 9/2004 | Birkert et al. ............... | 165/158 |

FOREIGN PATENT DOCUMENTS

| | | |
|---|---|---|
| CN | 365 392 | 11/1962 |
| DE | 110 188 | 12/1974 |
| DE | 27 06 849 C2 | 11/1977 |
| DE | 195 01 337 A1 | 7/1996 |
| DE | 196 54 368 A1 | 6/1998 |
| DE | 199 07 163 A1 | 10/1999 |
| DE | 198 33 338 A1 | 1/2000 |
| DE | 199 47 803 A1 | 4/2001 |
| GB | 2 354 960 A | 4/2001 |
| JP | 2000-282963 | 10/2000 |

* cited by examiner

*Primary Examiner*—Ljiljana Ciric
(74) *Attorney, Agent, or Firm*—Leydig, Voit & Mayer, Ltd.

(57) ABSTRACT

A tube plate for exhaust heat exchangers, with punched openings to hold the tube ends of a tube bundle, wherein the openings are arranged grid-like with a web width b, and each of the openings has a shear surface with a height h produced by punching, and a bevel of depth t, that is manufactured before punching, and wherein the height h is roughly the same as or smaller than the web width b, is disclosed.

13 Claims, 2 Drawing Sheets

TUBE PLATE FOR EXHAUST HEAT EXCHANGER

PRIORITY CLAIM

This application claims the benefit of copending German patent application DE 101 56 611.5, filed Oct. 26, 2001.

FIELD OF THE INVENTION

The invention pertains to a tube plate made of stainless steel for exhaust heat exchangers. A tube plate of this kind is described in applicant's German Patent No. DE A 199 07 163.

BACKGROUND OF THE INVENTION

The exhaust heat exchanger according to German Patent No. DE A 199 07 163 includes a housing in which a tube bundle is located, the tube ends being welded in two tube plates that are in turn welded to the housing. The exhaust flows through the tubes and the tubes are cooled on the outside by coolant drawn from the coolant cycle of an internal combustion engine. During operation of this kind of exhaust heat exchanger, damage, particularly breaks or cracks to the tube plate or to the welded tube plate joints, may occur, due to the very high alternating temperature stresses on the exhaust side. The tube plate of the known exhaust heat exchanger has a wall thickness on the order of 1 mm. Roughly rectangular openings are provided in this relatively thin tube plate, and they have a rather small separation, i.e., a relatively narrow web between neighboring openings. The web width is chosen to be relatively small in order to achieve a compact tube arrangement for the exhaust heat exchanger. For manufacturing reasons, however, the web width cannot be significantly less than the wall thickness of the plate. As a result, the web width, and thus, the spacing between the tubes, must increase to maintain manufacturability when tube plates with increased wall thicknesses are used. However, a larger web width reduces the efficiency of the exhaust heat exchanger and increases the spacing between the tubes, thus reducing their mutual support.

The present invention provides a tube plate for an exhaust gas heat exchanger that overcomes the limitations of known devices, as described above. These and other advantages of the present invention, as well as other inventive features, will be apparent from the description of the invention provided herein.

BRIEF SUMMARY OF THE INVENTION

The invention provides a tube plate for an exhaust heat exchanger, of the kind described above, that is able to withstand a high variation in thermal stress, and that can be manufactured with a relatively small web width using a punching technique.

To reduce the depth of the tube plate surface sheared by the punching tool, a bevel is provided in an embodiment of the invention. The bevel is preferably stamped at the edge of a tube opening before the punching operation. As a result, the punching tool that generates the finished tube opening need not separate (shear through) the entire wall thickness of the tube plate, but only the fraction that is defined by the depth of the bevel. Due to this conical expansion of the opening on one side of the tube plate, a thicker plate with small web width can be selected, i.e., one in which the plate wall thickness is greater than the web width.

According to one favorable embodiment, the tube plate has a wall thickness of more than 1.5 mm with an approximate web width of 1.5 mm or, preferably, a wall thickness of 2.0 mm with a web width of 1.5 mm. The greater overall strength of such a tube plate improves its resistance to highly variable heat stresses. Additionally, reducing the web width between individual plate openings allows the tubes to be more closely spaced, resulting in a more compact heat exchanger.

The invention may best be understood with reference to the accompanying drawings and to the detailed description provided herein.

DETAILED DESCRIPTION OF THE INVENTION

Figure 1:
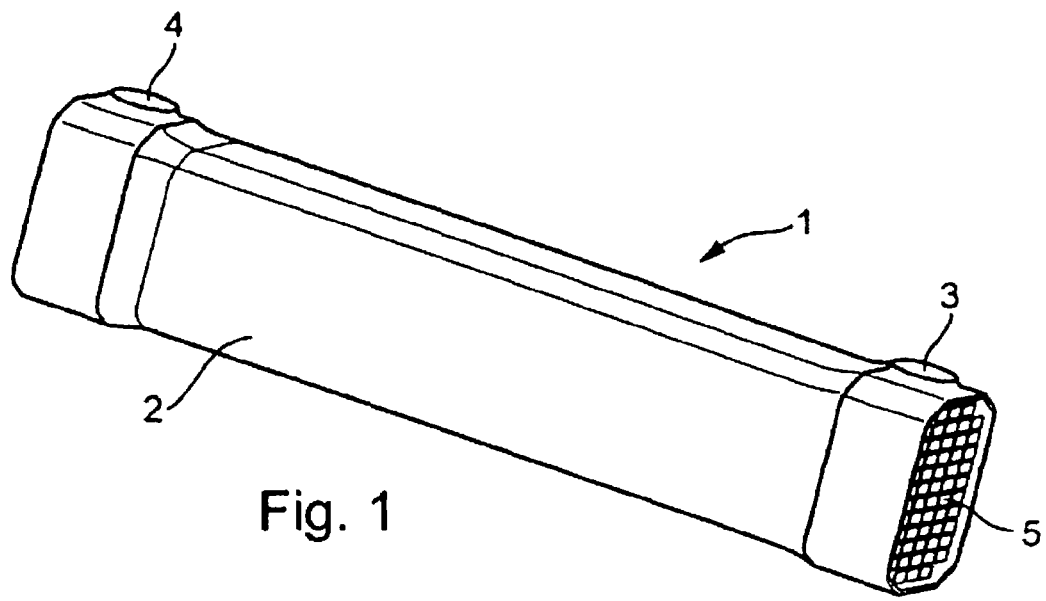
FIG. 1 is an oblique view of an exhaust heat exchanger.

FIG. 1 presents an oblique view of an exhaust heat exchanger 1 that consists of a housing mantle 2 with a coolant inlet 3 and a coolant outlet 4, at least one tube plate 5, and also a tube bundle (not visible here) located inside the housing mantle. Each tube of the bundle includes a connection end that is held in a tube plate 5, with a predetermined thickness. The connection end is welded there. The tube plate 5 is further welded to the housing mantle 2. This design is known in the prior art.

Figure 2:
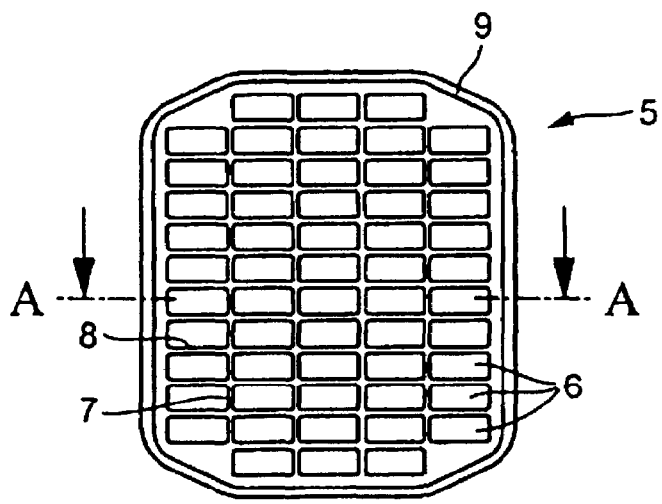
FIG. 2 is a tube plate for an exhaust heat exchanger.

FIG. 2 presents a top view of the tube plate 5 as a single detail. It has a number of roughly rectangular openings 6, arranged in a grid, that hold the exhaust tubes (not illustrated). Between the individual openings 6 there are vertically oriented web members 7 (in this drawing) and horizontally oriented web members 8, each having a predetermined width of 1.5 mm. The rectangular openings have an interior cross section of roughly 6 mm×13.5 mm. These dimensions correspond to the outside dimensions of the exhaust tubes. Moreover, as particularly shown in FIG. 2a, the tube plate 5 has a perimeter protruding flange 9. The tube plate 5 is welded to the housing by this flange 9.

Figure 2B:
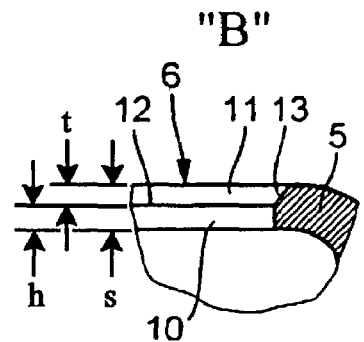
Figure 2A:
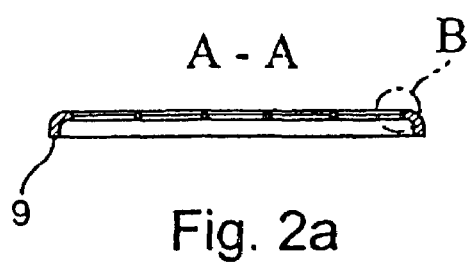

FIG. 2b shows Detail View "B" from FIG. 2a, as a longitudinal cross section through an opening 6, where only the right side is illustrated (the left is symmetric). The openings 6 are characterized by two wall sections, namely a lower section 10 and an upper section 11, the two being separated from each other by a perimeter edge 12. The upper section 11 is characterized by a perimeter bevel 13, i.e., a conical cross sectional expansion toward the outside, with respect to the lower section 10, which has a constant cross section across its height h. The bevel 13 has a predetermined depth indicated by reference symbol t, while the overall wall thickness of the tube plate 5 is denoted by reference symbol s. For punching the openings 6, it is of critical importance that the bevel 13 be formed before the finished opening 6 is punched. Specifically, a smaller opening (not illustrated) is first produced by a pre-punching step, and then the bevel 13 is produced following this by a stamping or impact extrusion step. Following this, a punching tool that has the shape of the openings 6 is used to produce the opening 6 with the punched section 10, such that an opening with a shear surface results. In an embodiment of the invention, the shear surface may adjoin the bevel. Thus, the punching tool needs only to penetrate a material thickness of predetermined height h. For example, given a thickness of the plate wall of s=2.0 mm, the height h of the shear surface will be 1.0 mm and the depth t of the bevel is thus also 1.0 mm. In this punching process it is therefore not necessary to penetrate the entire plate wall thickness of 2 mm, but rather only 50% of it, and thus the webs can also be chosen with a smaller width of 1.5 mm without concern for their being damaged during punching.

Figure 3:
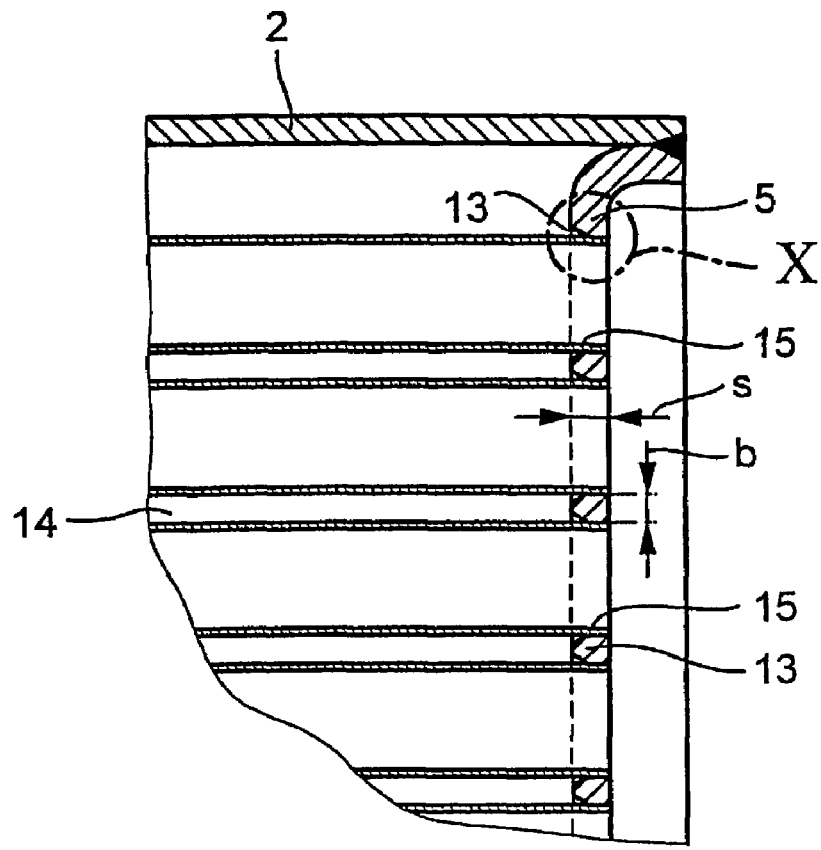
FIG. 3 is a partial cutaway view through the exhaust heat exchanger with housing, tube plate, and tubes.

FIG. 3 shows a longitudinal cross section of the exhaust heat exchanger, in which the housing mantle 2, the tube plate 5 and exhaust tubes 14 are shown. The tube ends 15 of the tube 14 are welded to the openings of the tube plate 5. In one embodiment, the tube plate has a predetermined wall thickness s=2.0 mm and a predetermined web width b=1.5 mm. This type of geometry cannot normally be manufactured by using punching technology for a tube plate having a ratio of s/b>1. However, providing a bevel 13, as described above, on the coolant side of the tube plate such that the height h of the shear surface is, at most, the same as web width b, allows the use of punching methods in the manufacture of openings with the stated dimensions. As a result, the predetermined thickness may be at least 1.5 mm when the predetermined width is 1.5 mm.

Figure 3A:
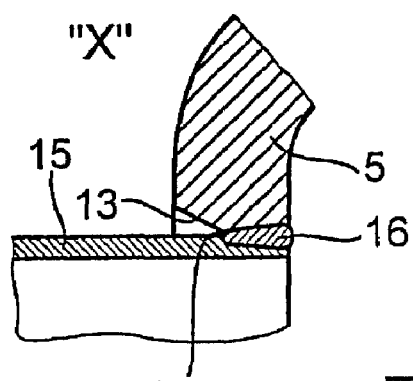

FIG. 3a shows a weld 16 (not illustrated in FIG. 3) as Detail View X of FIG. 3. The root 16a of the weld 16 produced by laser welding extends from the exhaust side of the tube plate 5 to the beginning of the bevel 13, which is formed on the bevel side of the tube plate 5, opposite the exhaust side. This design provides for a better weld between the tube and plate.

The tube plate in the exhaust heat exchanger described above can be used at temperatures up to 800° C. and is made preferably of a stainless steel alloy; this also applies to the exhaust tube and the housing mantle.

All of the references cited herein, including patents, patent applications, and publications, are hereby incorporated in their entireties by reference.

While this invention has been described with an emphasis on preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A tube plate for an exhaust heat exchanger, the tube plate comprising a tube plate wall and a grid with plurality of openings that are configured to hold connection ends of exhaust gas tubes, wherein the tube plate wall has a predetermined thickness and the plurality of the openings are separated by web members, each web member having a predetermined width that is less than the predetermined thickness of the tube plate wall, and each opening is defined by a perimeter bevel and a punched shear surface, wherein the perimeter bevel is formed before the punched shear surface is formed.

2. The tube plate of claim 1, wherein the punched shear surface has a predetermined height and the perimeter bevel has a predetermined depth.

3. The tube plate of claim 2, wherein the perimeter bevel adjoins the punched shear surface.

4. The tube plate of claim 2, wherein the predetermined thickness of the tube plate wall is more than the predetermined depth of the perimeter bevel.

5. The tube plate of claim 4, wherein the predetermined width of the web member is approximately 1.5 mm.

6. The tube plate of claim 4, wherein the predetermined thickness of the tube plate wall is 2.0 mm, and the predetermined width of the web member is 1.5 mm.

7. An exhaust heat exchanger comprising a housing mantle, at least one tube plate having a tube plate wall of a predetermined thickness, and a bundle of at least two exhaust gas tubes that are welded to openings in the tube plate by welds disposed on an exhaust side of the tube plate, wherein the tube plate further comprises:
at least two openings that are separated by web members, each web member having a predetermined width and being formed to include a bevel and a punched shear surface of a predetermined height wherein the bevel is formed before the punched shear surface the predetermined height of the punched shear surface is no greater than the predetermined width of the web members, and the predetermined width of the web members is less than the predetermined thickness of the tube plate wall.

8. The exhaust heat exchanger of claim 7, wherein at least one of the welds includes a root that extends from the exhaust side of the tube plate in a direction towards the bevel of the web member.

9. The exhaust heat exchanger of claim 7, wherein the tube plate includes a flange that is capable of being welded to the housing mantle of the heat exchanger.

10. The heat exchanger of claim 7, wherein the bevel of the web member is formed by stamping.

11. The heat exchanger of claim 7, wherein the bevel of the web member adjoins the punched shear surface.

12. The heat exchanger of claim 7, wherein the predetermined width of the web member is approximately 1.5 mm.

13. The heat exchanger of claim 7, wherein the predetermined thickness of the plate wall is 2.0 mm, and the predetermined width of the web member is 1.5 mm.

* * * * *